US007558989B2

(12) United States Patent
Vasudevan

(10) Patent No.: US 7,558,989 B2
(45) Date of Patent: Jul. 7, 2009

(54) IMPLEMENTING PERSISTENCE AND REFRESHING OF VALIDATION ERROR MESSAGES BASED UPON HIERARCHICAL REFRESH LEVELS

(75) Inventor: Cheranellore Vasudevan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 556 days.

(21) Appl. No.: 11/340,753

(22) Filed: Jan. 26, 2006

(65) Prior Publication Data

US 2007/0174741 A1      Jul. 26, 2007

(51) Int. Cl.
  *G06F 11/00*  (2006.01)
(52) U.S. Cl. .......................................... 714/48; 714/57
(58) Field of Classification Search .................. 714/46, 714/48, 57
  See application file for complete search history.

(56) References Cited

U.S. PATENT DOCUMENTS

| 5,483,637 | A  | * | 1/1996  | Winokur et al. | 714/26  |
| 5,673,386 | A  | * | 9/1997  | Batra          | 714/38  |
| 6,006,016 | A  | * | 12/1999 | Faigon et al.  | 714/48  |
| 6,182,249 | B1 | * | 1/2001  | Wookey et al.  | 714/47  |
| 6,684,265 | B2 | * | 1/2004  | Graf           | 710/18  |
| 7,240,247 | B2 | * | 7/2007  | Petri et al.   | 714/57  |
| 7,389,447 | B2 | * | 6/2008  | Norman         | 714/46  |
| 2002/0083377 | A1 | * | 6/2002 | Clauss et al.  | 714/57  |

* cited by examiner

*Primary Examiner*—Joshua A Lohn
(74) *Attorney, Agent, or Firm*—Joan Pennington

(57) ABSTRACT

A method, apparatus and computer program product are provided for implementing persistence and refreshing of validation error messages based upon hierarchical refresh levels. A validation level is identified when a validation completes. Error messages stored in a message repository with a refresh tag level less than or equal to the validation level are removed. Then new error messages with a refresh tag level less than or equal to the validation level are collected and added to the message repository. The validation level indicates a type of validation stage that potentially updates the status of a particular error condition and message. Multiple validation levels may be represented by predefined numeric values, with larger values representing higher levels in a hierarchy.

17 Claims, 6 Drawing Sheets

IMPLEMENTING PERSISTENCE AND REFRESHING OF VALIDATION ERROR MESSAGES BASED UPON HIERARCHICAL REFRESH LEVELS

FIELD OF THE INVENTION

The present invention relates generally to the data processing field, and more particularly, relates to a method, apparatus and computer program product for implementing persistence and refreshing of validation error messages based upon hierarchical refresh levels.

DESCRIPTION OF THE RELATED ART

When errors occur at different phases of validation, it is often difficult to detect which messages need to be refreshed. An example is a user interface (UI) page level validation that will cover all the control level validation too and similarly, a product level validation may validate all selection pages.

When a user makes a correction in one of the controls in error, the error message needs to be identified in order to update it. This causes some messages to hang around although the correction for them has already been done and also sometimes causes showing duplicate messages too. This is especially a major issue if the error messages are persisted outside the logic where they are originated.

Error messages are often linked to the phase at which the messages are generated and the messages are refreshed only when the validation goes through that phase once again.

A need exists for an improved mechanism for effectively implementing persistence and refreshing of validation error messages.

SUMMARY OF THE INVENTION

Principal aspects of the present invention are to provide a method, apparatus and computer program product for implementing persistence and refreshing of validation error messages based upon hierarchical refresh levels. Other important aspects of the present invention are to provide such method, apparatus and computer program product for implementing persistence and refreshing of validation error messages based upon hierarchical refresh levels substantially without negative effect and that overcome many of the disadvantages of prior art arrangements.

In brief, a method, apparatus and computer program product are provided for implementing persistence and refreshing of validation error messages based upon hierarchical refresh levels. A validation level is identified when a validation completes. Error messages stored in a message repository with a refresh tag level less than or equal to the validation level are removed. Then new error messages with a refresh tag level less than or equal to the validation level are collected and added to the message repository.

In accordance with features of the invention, the validation level indicates a type of validation stage that potentially updates the status of a particular error condition and message. Multiple validation levels may be represented by predefined numeric values, with larger values representing higher levels in a hierarchy. The error messages carry the refresh tag level indicating a lowest validation level that the error message can be generated and refreshed.

In accordance with features of the invention, the refresh tag level indicates at what time the error message can be updated and refreshed, rather than when the error message was generated.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1A:
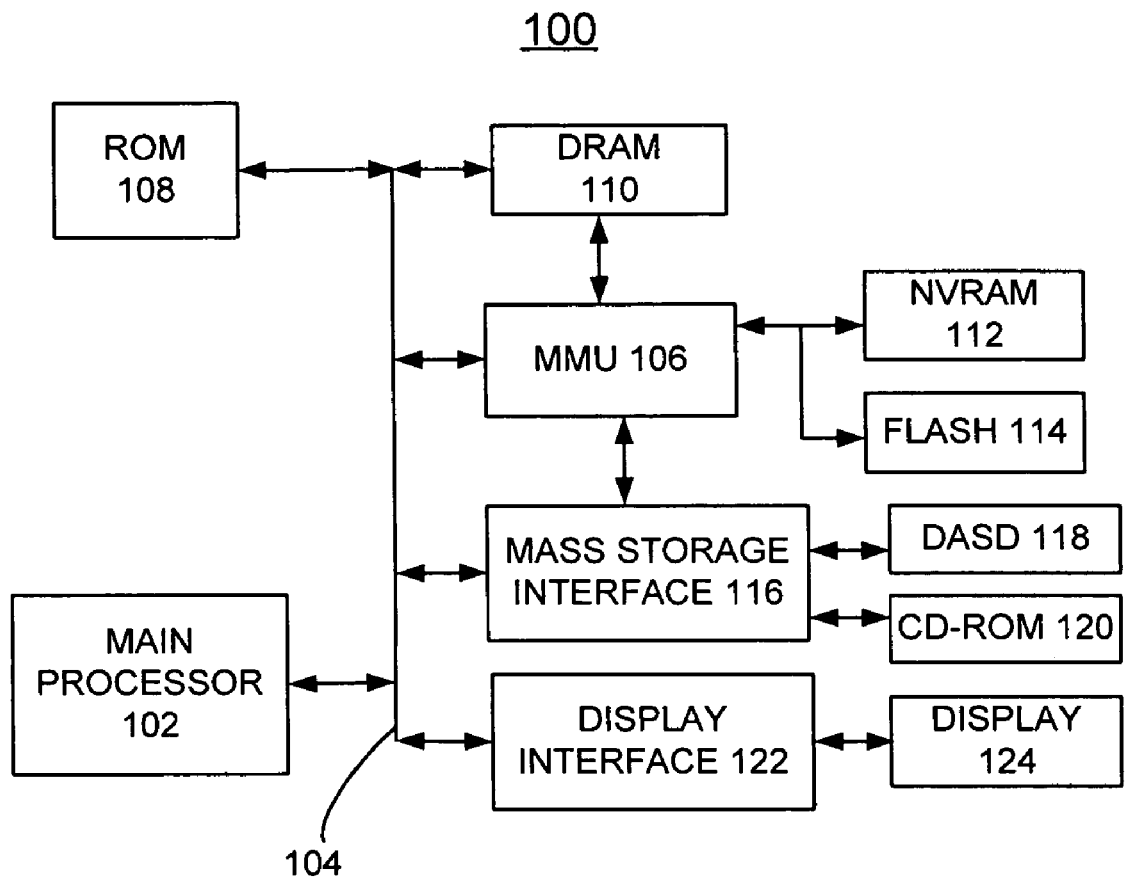
FIGS. 1A and 1B together provide a schematic diagram of an exemplary computer system and operating system for implementing persistence and refreshing of validation error messages bases upon hierarchical refresh levels in accordance with the preferred embodiment.
Figure 1B:
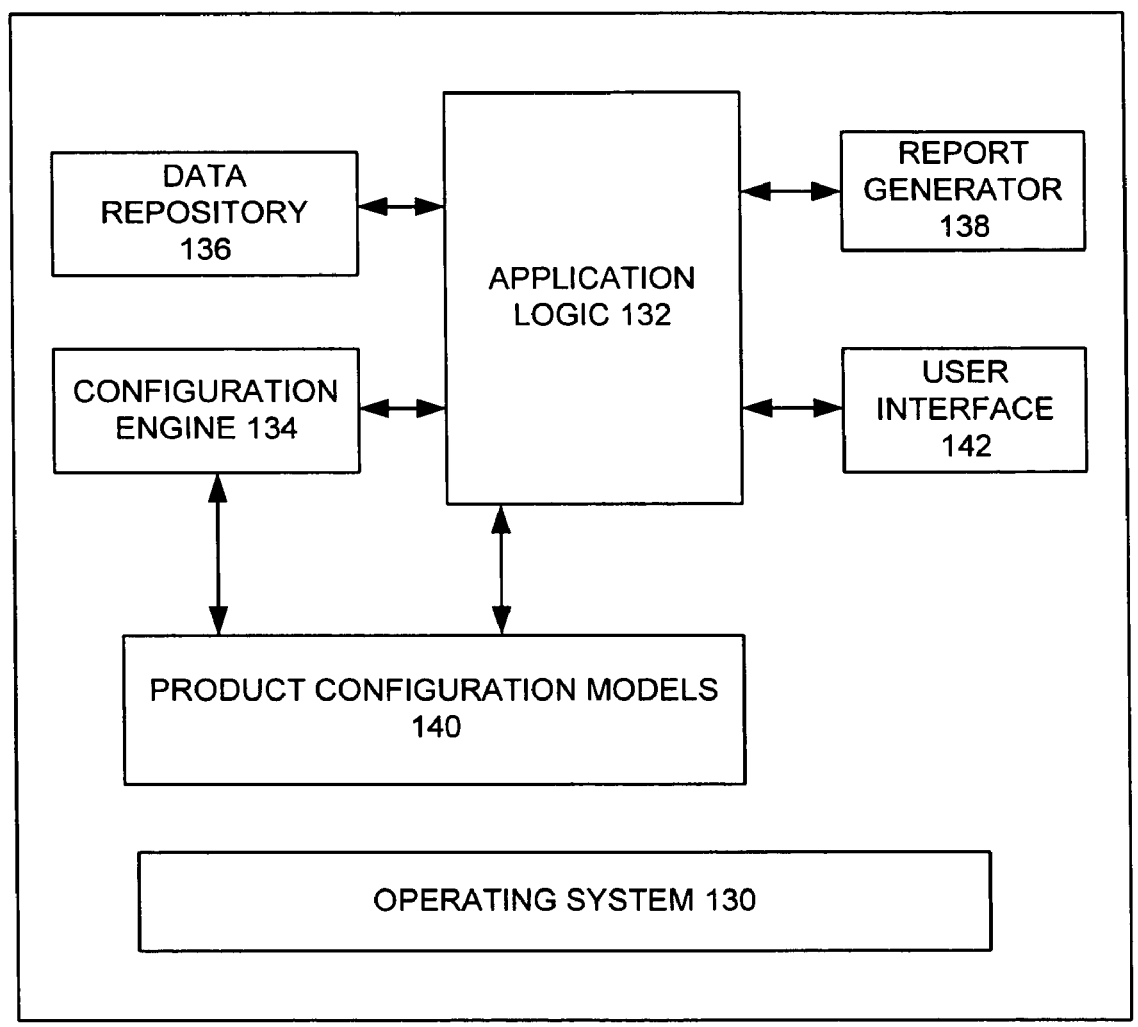

Having reference now to the drawings, in FIGS. 1A and 1B, there is shown an exemplary computer system generally designated by the reference character 100 for implementing methods for supporting persistence and refreshing of validation error messages bases upon hierarchical refresh levels in accordance with the preferred embodiment. Computer system 100 includes a main processor 102 or central processor unit (CPU) 102 coupled by a system bus 104 to a memory management unit (MMU) 106 and system memory including, a read only memory 108, a dynamic random access memory (DRAM) 110, a nonvolatile random access memory (NVRAM) 112, and a flash memory 114. A mass storage interface 116 coupled to the system bus 104 and MMU 106 connects a direct access storage device (DASD) 118 and a CD-ROM drive 120 to the main processor 102. Computer system 100 includes a display interface 122 connected to a display 124.

Computer system 100 is shown in simplified form sufficient for understanding the present invention. The illustrated computer system 100 is not intended to imply architectural or functional limitations. The present invention can be used with various hardware implementations and systems and various other internal hardware devices, for example, instead of a single main processor 102, multiple main processors can be used.

As shown in FIG. 1B, computer system 100 includes an operating system 130, an application logic 132 coupled to a configuration engine 134 of the preferred embodiment, a data repository 136, a report generator 138, product configuration models 140, and a user interface 142.

For example, an exemplary sales order configuration system is defined by the application logic 132, the configuration engine 134 of the preferred embodiment, data repository 136, report generator 138, product configuration models 140, and user interface 142. Sales Order Configuration is the process of gathering customer requirements at the point of sale in order to generate a unique system that fits the customer's functional needs. Sales Order Configuration systems are very essential to support sales and manufacturing, especially as the systems become more and more complex and customers need to be offered flexibility for their own mixing and matching. For example, the relevance of such configuration tools include the following: 1) Large set of options, 2) Complexity of systems, 3) Need for what if analysis, 4) Need to shorten sales cycles, and 5 Need to provide customized products and services to meet customer demands.

The configuration engine 134 uses the product configuration models 140 and executes and validates the behavior of a selected product and corresponding user inputs. Each product configuration model 140 is a representation of product configuration rules such as compatibility, capacity validation, filtering, and the like. The data repository 136 is a store of both static and run-time data to support sales configuration. The user interface 142 is used to collect user inputs as well as show the user the results of the configuration such as summary bill of materials (BOM), error messages, price data, help messages, and the like.

In accordance with features of the preferred embodiment, a new method and algorithm are provided to support the persistence and refresh of error messages. Error messages are identified to a refresh level and a validation hierarchy level; and a validation in a higher hierarchy level validates all the lower levels too. The refresh level and the validation hierarchy level are used to identify a subset of error messages that need to be refreshed. The refresh level and the validation hierarchy level provide a framework for proper persistence and refreshing of error messages.

Figure 2:
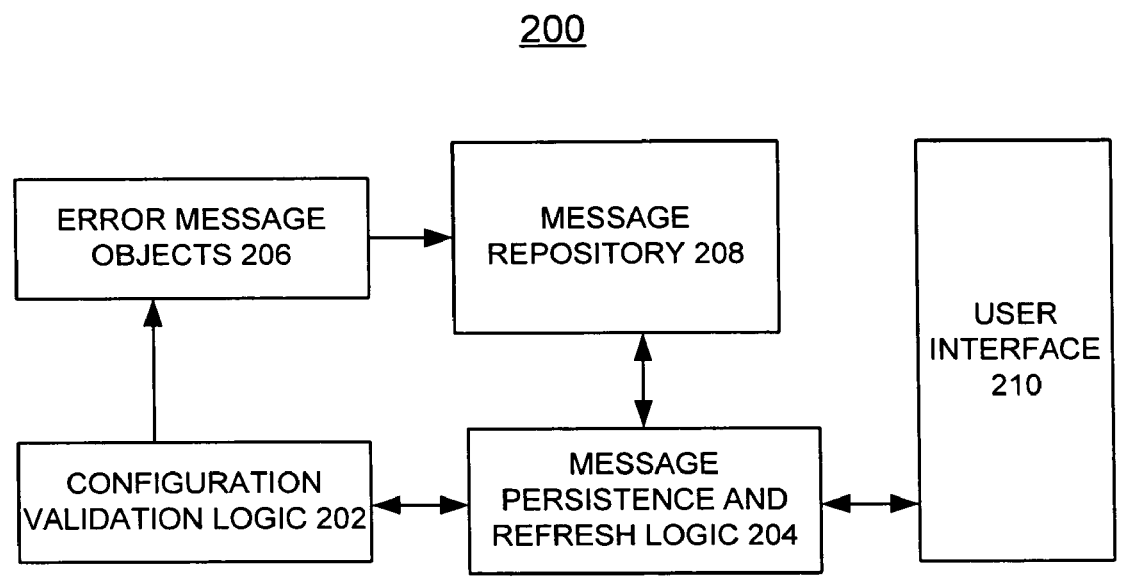
FIG. 2 is a block diagram representation illustrating an exemplary error messaging architecture that uses hierarchical validation and multiple refresh levels in accordance with the preferred embodiment.

Referring now to FIG. 2, there is shown an exemplary error messaging architecture generally designated by the reference character 200 that uses hierarchical validation and multiple refresh levels in accordance with the preferred embodiment. Error messaging architecture 200 includes configuration validation logic 202, message persistence and refreshing logic 204, error message objects 206, and a message repository 208. Configuration validation logic 202 generates error messages based on validation results. The message persistence information of logic 204 functions in marking the messages with corresponding refresh levels. The error messages generated by logic 202 are stored in the message repository 208. Only a subset of the messages is displayed to user based on duplicate state, persistence, and the like. The messages are deleted when needed to be refreshed based on the user action of validation at various levels.

Figure 3:
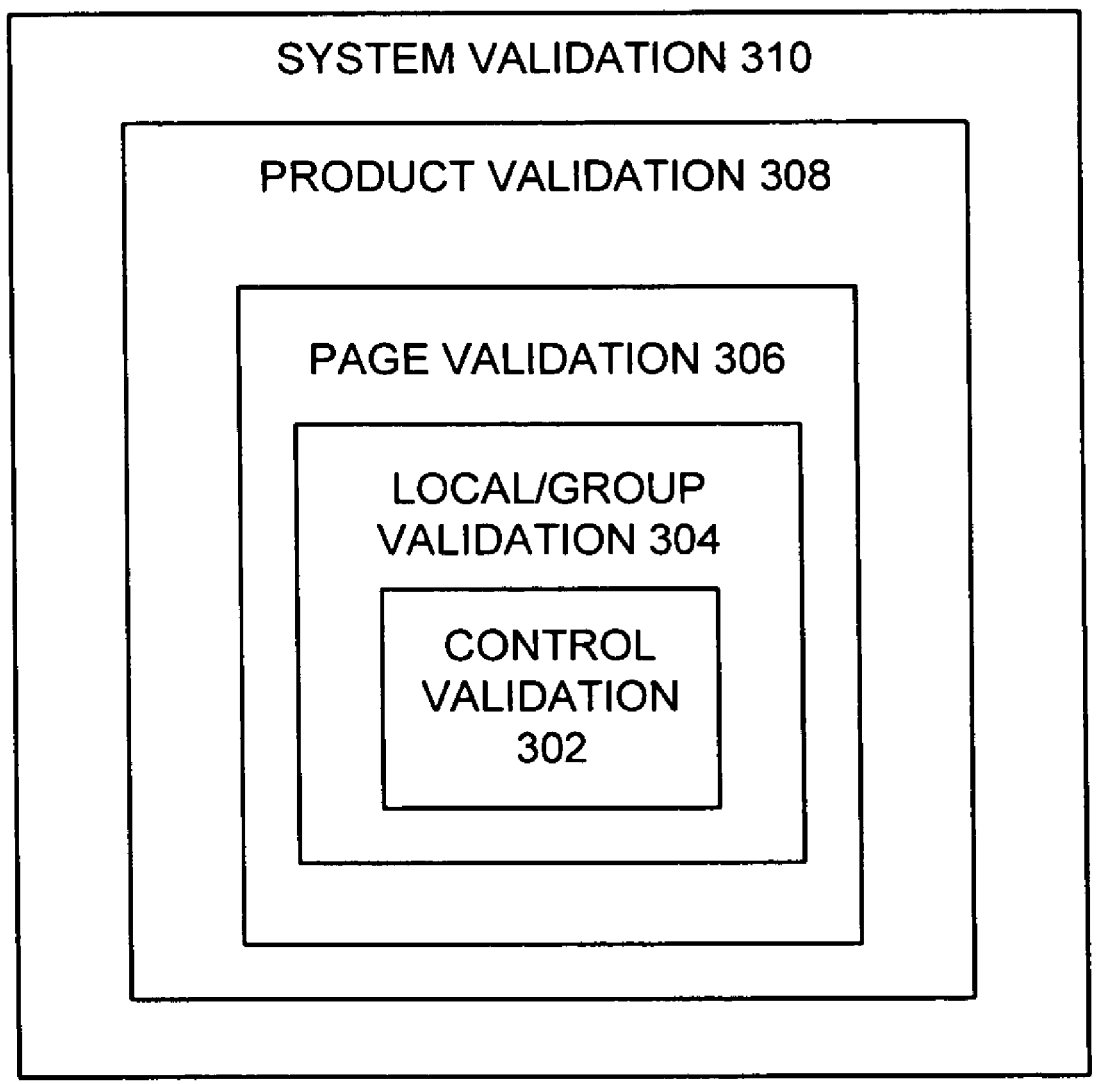
FIG. 3 is a block diagram representation illustrating an exemplary hierarchy of validation for the error messaging architecture uses of FIG. 2 in accordance with the preferred embodiment.

Referring also to FIG. 3, there is shown an exemplary hierarchy of validation generally designated by the reference character 300 for the error messaging architecture 200 in accordance with the preferred embodiment. Starting at a lowest level, validation hierarchy 300 includes a control validation 302, a local or group validation 304, a page validation 306, a product validation 308, and a system validation 310.

Each message or error message object 206 carries information about when it needs to refreshed independent of the when it was originally generated. The messages are refreshed based on the hierarchy of validation as shown in FIG. 3, and the specified refresh level for the message. For example, when the complete system is validated at system validation 310, all messages are removed from the message repository 208 and recreated based on the new outcome. A particular product validation at product validation 308 leads to recreation of messages that originate from the product being worked on. When a page is validated at page validation 306, all error messages from the product are not refreshed only those that are relevant to page under consideration and lower validation hierarchy levels are refreshed in accordance with the preferred embodiment. Similarly, still lower levels are the group or local validation 304, which are subset of controls within a page, and the lowest is the single control level validation at control validation 302. For a group or local validation 304, error messages for the group or local validation 304 and the lower validation hierarchy level of the control validation 302 are refreshed in accordance with the preferred embodiment. For the lowest control validation 302, only error messages for the lower validation hierarchy level of the control validation 302 are refreshed in accordance with the preferred embodiment.

Errors may occur during interactive and triggered validation phases. Errors generated in a triggered validation typically persist only during when the trigger is ON. However, since those errors indicate an invalid context, the corresponding error messages need to be cached and persisted in some framework. These persisted messages need to be refreshed, deleted or updated whenever the error condition is corrected or modified. This is often a tricky situation. The problem becomes more complex when there multiple validation triggers at different levels. When to persist an error message and when to update it subsequently is a major issue as the state of the system from a user validation perspective may be different from the validation logic state. For example, the error messages generated by the batch mode validation may be still valid even when editing/customizing the selections. However, the validation logic may not perceive those error conditions as the triggers may not be valid during customization phase. Similarly, some validation rules may get triggered either in batch mode or by interactive submissions.

In accordance with features of the preferred embodiment, effective persistence and refresh of validation error messages are provide through methods based upon hierarchical levels of validation and a refresh tag level that indicates when to refresh. For example, in a typical GUI application, control level validation 302 is lower in hierarchy to a page level validation 306. Further the product level validation 308 is higher than page-level validation 306 and subsequently, solution-level validation. The underlying principle of this exemplary hierarchy 300 is that a validation that happens at a particular level also validates its lower levels in accordance with the preferred embodiment. For example, a page validation 306 also will encompass all control-level validations 302. This method is used to determine when the messages emerging from the validations should be refreshed. For example, different hierarchical level is represented by a Validation Level, as shown in the flow chart of FIG. 4. This Validation Level indicates the type of validation stage that will potentially update the status of this particular error condition and message. Multiple Validation Levels may be represented as numeric values, such as 10, 20, 30, . . . , 100, and the like. The larger numbers represent Validation Level of higher levels in a hierarchy.

Figure 4:
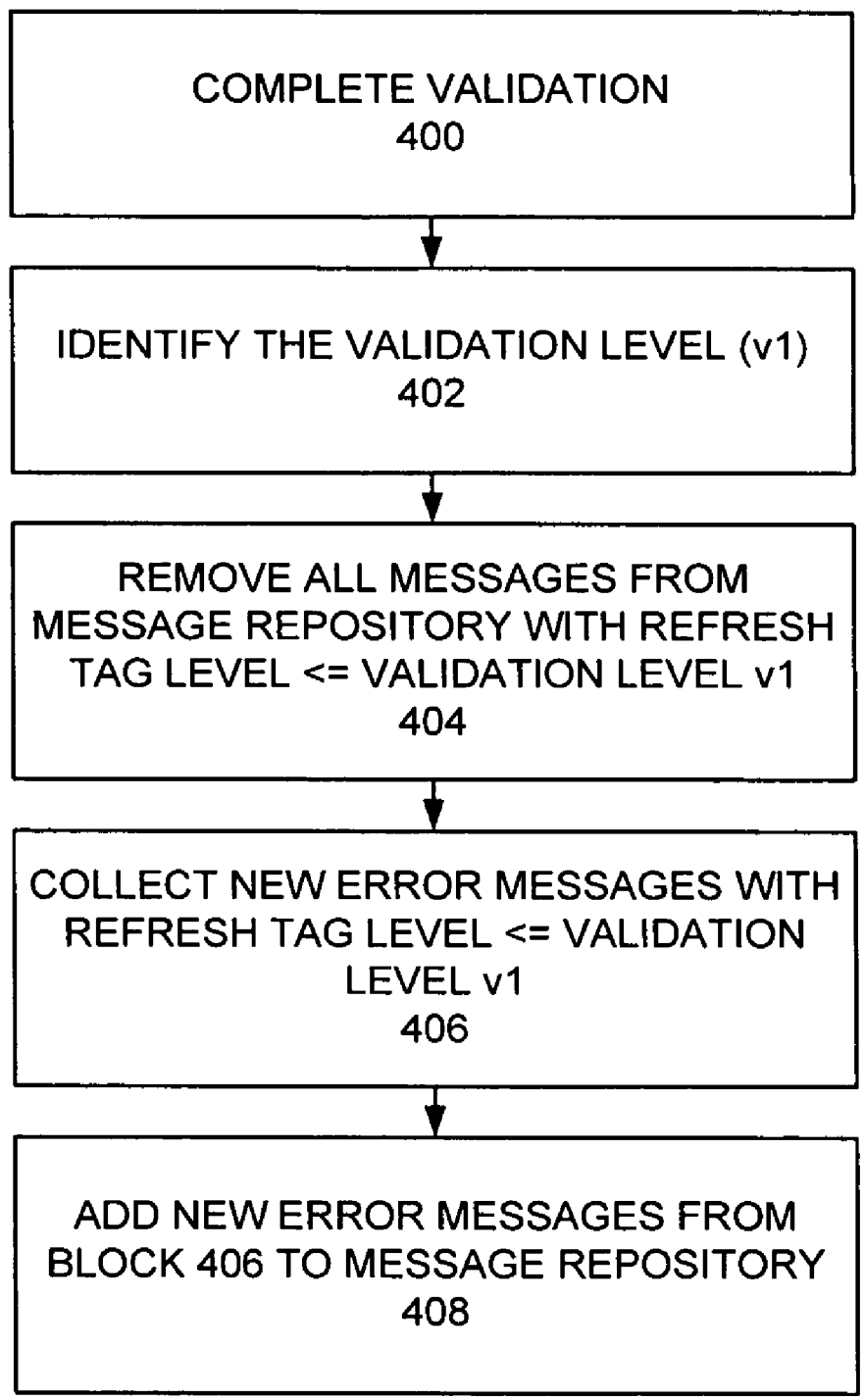
FIG. 4 is a flow chart illustrating exemplary steps for implementing persistence and refreshing of validation error messages bases upon hierarchical refresh levels in accordance with the preferred embodiment.

In accordance with features of the preferred embodiment, as shown in the flow chart of FIG. 4 the error messages also carry a Refresh tag level assigned by programmer to indicate at what lowest Validation Level the particular message can be generated and refreshed. This Refresh tag level indicates at what time this message can be updated and refreshed. Each message, basically, carries the information regarding when it can be re-examined or refreshed.

In accordance with features of the preferred embodiment, a message should be refreshed or updated based on the Refresh tag level, or flag that indicates when to refresh, rather than when it was generated. For example, when a page validation 306 occurs, since it has higher Validation Level than control-level validation 302, all control level error messages will be refreshed, for example, discarded and recreated, while the product level messages remain untouched. The Refresh tag level and the Validation Level, thus together determine which message to be updated and which one to be persisted or maintained. The flow chart provided in FIG. 4 illustrates the algorithm of preferred embodiment. The algorithm of preferred embodiment, though generally simple, is a novel method for representing validation error messages and their refresh.

Referring now to FIG. 4, there are shown exemplary steps for implementing persistence and refreshing of validation error messages bases upon hierarchical refresh levels in accordance with the preferred embodiment. First validation is completed as indicated in a block 400.

Next the validation level, for example, validation level (v1) is identified as indicated in a block 402. All messages from the message repository 208 with a refresh tag level less than or equal to validation level v1 are removed as indicated in a block 404.

Then all new messages with a refresh tag level less than or equal to validation level v1 are collected as indicated in a block 406. All new messages with a refresh tag level less than or equal to validation level v1 collected at block 406 are added to the message repository 208 as indicated in a block 408. This completes the message refresh of the preferred embodiment.

Figure 5:
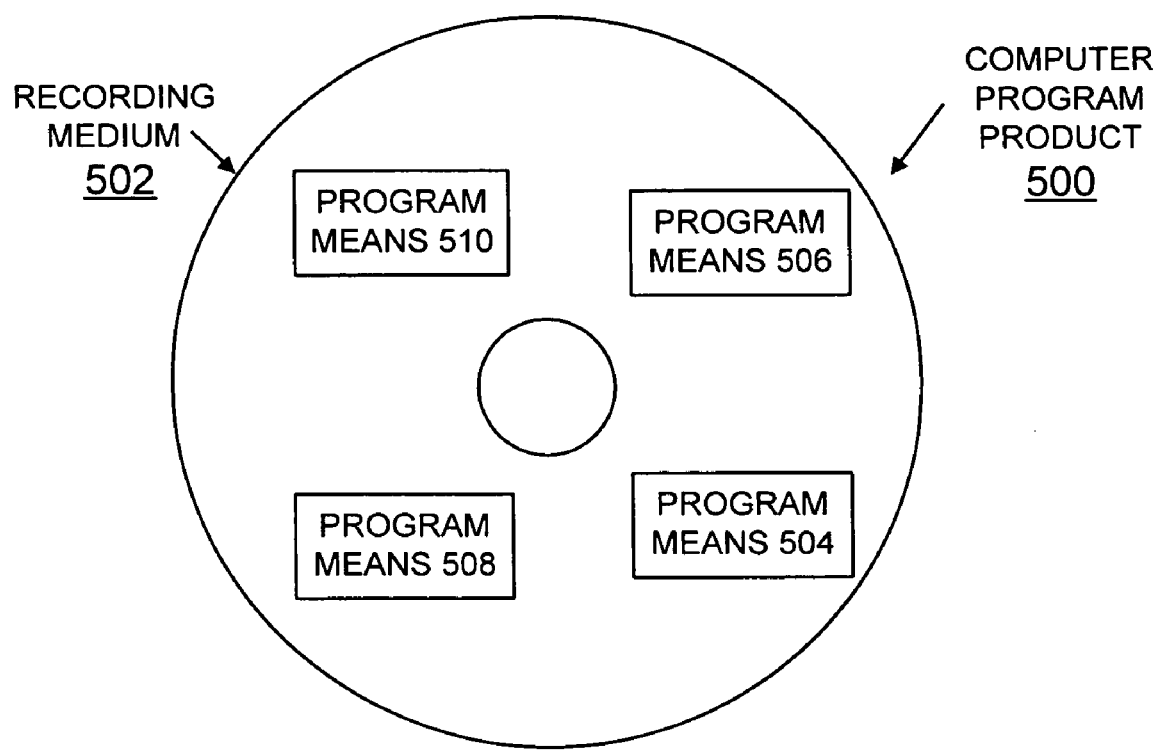
FIG. 5 is a block diagram illustrating a computer program product in accordance with the preferred embodiment.

Referring now to FIG. 5, an article of manufacture or a computer program product 500 of the invention is illustrated. The computer program product 500 includes a recording medium 502, such as, a floppy disk, a high capacity read only memory in the form of an optically read compact disk or CD-ROM, a tape, or a similar computer program product. Recording medium 502 stores program means 504, 506, 508, 510 on the medium 502 for carrying out methods for supporting persistence and refreshing of validation error messages bases upon hierarchical refresh levels of the preferred embodiment in the system 100 of FIGS. 1A and 1B.

A sequence of program instructions or a logical assembly of one or more interrelated modules defined by the recorded program means 504, 506, 508, 510, direct the computer system 100 for supporting persistence and refreshing of validation error messages bases upon hierarchical refresh levels of the preferred embodiment.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

While the present invention has been described with reference to the details of the embodiments of the invention shown in the drawing, these details are not intended to limit the scope of the invention as claimed in the appended claims.

What is claimed is:

1. A computer-implemented method for implementing persistence and refreshing of validation error messages based upon hierarchical refresh levels in a computer system comprising:

providing configuration validation logic for generating error messages based upon a selected one of a plurality of validation stages; each of said plurality of validation stages including a validation level;

providing message persistence and refreshing logic for marking each of the error messages with a corresponding refresh tag level; said refresh tag level indicating when the error message is to be refreshed independent of when the error message was generated;

identifying the validation level when a validation completes;

identifying and removing error messages stored in a message repository with a refresh tag level less than or equal to the validation level;

collecting and adding new error messages with said refresh tag level less than or equal to the validation level to the message repository.

2. A computer-implemented method for implementing persistence and refreshing of validation error messages as recited in claim 1 wherein the validation level indicates a type of said validation stage for updating a status of a particular error condition and error message.

3. A computer-implemented method for implementing persistence and refreshing of validation error messages as recited in claim 1 includes representing a plurality of validation levels by predefined numeric values with larger values representing higher levels in a hierarchy.

4. A computer-implemented method for implementing persistence and refreshing of validation error messages as recited in claim 1 includes indicating a lowest validation level for the error message to be generated and refreshed with said refresh tag level.

5. A computer-implemented method for implementing persistence and refreshing of validation error messages as recited in claim 1 wherein the validation level includes a system validation level, said system validation level being a highest validation level; and wherein identifying and removing error messages includes identifying and removing each error message stored in said message repository.

6. A computer-implemented method for implementing persistence and refreshing of validation error messages as recited in claim 1 wherein the validation level includes a control validation level, said control validation level being a lowest validation level; and wherein identifying and removing error messages includes identifying and removing only error messages having said refresh tag level equal to said control validation level.

7. Apparatus for implementing persistence and refreshing of validation error messages based upon hierarchical refresh levels in a computer system comprising:

configuration validation logic for generating error messages based upon a selected one of a plurality of validation stages; each of said plurality of validation stages including a validation level;

message persistence and refreshing logic for marking each of the error messages with a corresponding refresh tag level; said refresh tag level indicating when the error message is to be refreshed independent of when the error message was generated;

a message repository for storing said generated error messages; said error message including a refresh tag level including a validation level value;

said message persistence and refresh logic for identifying a validation level when a validation completes; said message persistence and refresh logic for said identifying and removing error messages stored in said message repository with said refresh tag level less than or equal to said identified validation level; and said message persistence and refresh logic for collecting and adding new error messages with said refresh tag level less than or equal to the validation level to the message repository.

8. Apparatus for implementing persistence and refreshing of validation error messages as recited in claim 7 wherein each said validation level is represented by predefined numeric value and wherein a larger value represents a higher level in a hierarchy of said plurality of validation stages.

9. Apparatus for implementing persistence and refreshing of validation error messages as recited in claim 7 wherein said refresh tag level indicates a lowest validation level for the error message to be generated and refreshed.

10. Apparatus for implementing persistence and refreshing of validation error messages as recited in claim 7 wherein said validation level includes a system validation level, said system validation level being a highest validation level; and
wherein said message persistence and refresh logic refreshes each error message stored in said message repository responsive to said system validation level.

11. Apparatus for implementing persistence and refreshing of validation error messages as recited in claim 7 wherein said validation level includes a control validation level, said control validation level being a lowest validation level; and
wherein said message persistence and refresh logic refreshes only error messages having said refresh tag level equal to said control validation level responsive to said control validation level.

12. A computer program product stored on a computer-readable medium for implementing persistence and refreshing of validation error messages in a computer system, said computer program product including instructions executed by the computer system to cause the computer system to perform:
using configuration validation logic, generating error messages based upon a selected one of a plurality of validation stages; each of said plurality of validation stages including a validation level;
using message persistence and refreshing logic, marking each of the error messages with a corresponding refresh tag level; said refresh tag level indicating when the error message is to be refreshed independent of when the error message was generated;
identifying the validation level when a validation completes;
identifying and removing error messages stored in a message repository with a refresh tag level less than or equal to the validation level;
collecting and adding new error messages with said refresh tag level less than or equal to the validation level to the message repository.

13. A computer program product for implementing persistence and refreshing of validation error messages as recited in claim 12 wherein the validation level indicates a type of validation stage for updating a status of a particular error condition and error message.

14. A computer program product for implementing persistence and refreshing of validation error messages as recited in claim 12 includes representing a plurality of validation levels by predefined numeric values with larger values representing higher levels in a hierarchy.

15. A computer program product for implementing persistence and refreshing of validation error messages as recited in claim 12 includes indicating a lowest validation level for the error message to be generated and refreshed with said refresh tag level.

16. A computer program product for implementing persistence and refreshing of validation error messages as recited in claim 12 wherein the validation level includes a system validation level, said system validation level being a highest validation level; and wherein identifying and removing error messages includes identifying and removing each error message stored in said message repository responsive to said system validation level.

17. A computer program product for implementing persistence and refreshing of validation error messages as recited in claim 12 wherein the validation level includes a control validation level, said control validation level being a lowest validation level; and wherein identifying and removing error messages includes identifying and removing only error messages having said refresh tag level equal to said control validation level.

* * * * *